(12) United States Patent
Takakuwa et al.

(10) Patent No.: US 10,944,194 B2
(45) Date of Patent: Mar. 9, 2021

(54) COAXIAL CONNECTOR, HIGH FREQUENCY UNIT, AND RECEIVER

(71) Applicant: SONY SEMICONDUCTOR SOLUTIONS CORPORATION, Kanagawa (JP)

(72) Inventors: Hiroshige Takakuwa, Kanagawa (JP); Takahiro Ando, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/325,307

(22) PCT Filed: Jun. 19, 2017

(86) PCT No.: PCT/JP2017/022491
§ 371 (c)(1),
(2) Date: Feb. 13, 2019

(87) PCT Pub. No.: WO2018/037684
PCT Pub. Date: Mar. 1, 2018

(65) Prior Publication Data
US 2019/0181577 A1 Jun. 13, 2019

(30) Foreign Application Priority Data

Aug. 23, 2016 (JP) .................. 2016-162663

(51) Int. Cl.
*H01R 13/60* (2006.01)
*H01R 13/11* (2006.01)
(Continued)

(52) U.S. Cl.
CPC ........... *H01R 13/112* (2013.01); *H01R 13/40* (2013.01); *H01R 24/40* (2013.01); *H01R 24/52* (2013.01);
(Continued)

(58) Field of Classification Search
CPC ............... H01R 13/518; H01R 13/745; H01R 23/7042; H01R 23/025; H01R 13/5202
(Continued)

(56) References Cited

U.S. PATENT DOCUMENTS 4,491,685 A 1/1985 Drew et al.
6,019,622 A 2/2000 Takahashi et al.
(Continued)

FOREIGN PATENT DOCUMENTS

JP S59-138183 9/1984
JP 2004-228021 8/2004

OTHER PUBLICATIONS

International Search Report prepared by the Japan Patent Office dated Jul. 5, 2017, for International Application No. PCT/JP2017/022491.
(Continued)

*Primary Examiner* — Phuong Chi Thi Nguyen
(74) *Attorney, Agent, or Firm* — Sheridan Ross P.C.

(57) ABSTRACT

A coaxial connector includes a cylindrical external conductor including a metal material, a first insulating member arranged in the external conductor, a second insulating member including a front surface plate in which a wire insertion hole is formed and a plurality of elastic pieces which extends from the front surface plate toward a rear surface and of which an end overlaps with a side of a front surface of the first insulating member and is movable in a direction from a front surface toward a rear surface, and a center electrode arranged in a hollow portion in the first and second insulating members and including a terminal led out from a rear surface of the first insulating member to outside and clamping pieces for clamping the wire connected to the terminal.

7 Claims, 9 Drawing Sheets

(51) Int. Cl.
   *H01R 24/52*  (2011.01)
   *H01R 13/40*  (2006.01)
   *H01R 24/40*  (2011.01)
   *H04N 5/44*   (2011.01)
   *H04N 7/10*   (2006.01)
   *H01R 103/00* (2006.01)

(52) U.S. Cl.
   CPC ............... *H04N 5/44* (2013.01); *H04N 7/10* (2013.01); *H01R 2103/00* (2013.01)

(58) Field of Classification Search
   USPC ............ 439/540.1, 534, 550, 563, 536, 527
   See application file for complete search history.

(56) References Cited

U.S. PATENT DOCUMENTS

| | | | |
|---|---|---|---|
| 9,923,308 B2 * | 3/2018 | Holland | H01R 24/525 |
| 10,236,646 B2 * | 3/2019 | Holland | H01R 24/46 |
| 10,305,225 B2 * | 5/2019 | Holland | H01R 24/525 |
| 10,566,748 B2 * | 2/2020 | Holland | H01R 24/46 |

OTHER PUBLICATIONS

Extended European Search Report for European Patent Application No. 17843172.2, dated Jul. 11, 2019, 10 pages.

Official Action (with English translation) for Chinese Patent Application No. 201780050013.1, dated Mar. 16, 2020, 11 pages.

* cited by examiner

COAXIAL CONNECTOR, HIGH FREQUENCY UNIT, AND RECEIVER

CROSS REFERENCE TO RELATED APPLICATIONS

This application is a national stage application under 35 U.S.C. 371 and claims the benefit of PCT Application No. PCT/JP2017/022491 having an international filing date of 19 Jun. 2017, which designated the United States, which PCT application claimed the benefit of Japanese Patent Application No. 2016-162663 filed 23 Aug. 2016, the entire disclosures of each of which are incorporated herein by reference.

TECHNICAL FIELD

The present technology relates to, for example, a coaxial connector which can be applied to an F-type connector, a high frequency unit, and a receiver.

BACKGROUND ART

A coaxial cable is used to transmit signals for television broadcasting (terrestrial broadcasting, satellite broadcasting, cable television, and the like). For example, an F-type connector has been known as a coaxial connector used for supplying an output of an antenna to a tuner in a television receiver, a personal computer, and the like. One type of the F-type connector is connected to one end of the coaxial cable and is referred to as an F-type connector plug and the like. Other type is an F-type connector which accepts a center conductor (referred to as core wire) of the coaxial cable projected from the F-type connector plug and is referred to as an F-type connector receptacle and the like. The F-type connector receptacle will be described below. However, the F-type connector receptacle is simply referred to as an F-type connector.

An example of the F-type connector is described in Patent Document 1. The F-type connector includes a center electrode to which a core wire of a coaxial cable is inserted, a cylindrical insulating resin supporting the center electrode, and a metal external conductor provided on the outer side of the insulating resin.

CITATION LIST

Patent Document

Patent Document 1: Japanese Patent Application Laid-Open No. 2004-228021

SUMMARY OF THE INVENTION

Problems to be Solved by the Invention

In a conventional F-type connector, an insulator supporting a center electrode is arranged in an external conductor and an end of the insulator is caulked so as to fix the insulator. However, since there is a possibility that the insulator is broken, a force to fastening the caulking cannot be increased. As a result, there is a case where caulking is loosened. Furthermore, the caulking varies. Moreover, reflow soldering is applied when a tuner unit including the coaxial connector is attached to a substrate such as a television receiver. The insulator is recrystallized due to heat at the time of reflow soldering and slightly shrunk, and a gap is generated, for example, between a caulking portion of the external conductor and the insulator. In a case where the tuner unit is attached to, for example, a television receiver, when large sound is generated from a speaker, a chassis of a set vibrates, and the vibration is transmitted to the tuner. Due to the gap described above, there has been a possibility that the insulator is resonated and abnormal noise is generated.

Accordingly, an object of the present technology is to provide a coaxial connector, a high frequency unit, and a receiver for preventing occurrence of abnormal noise.

Solutions to Problems

The present technology is a coaxial connector including:
a cylindrical external conductor including a metal material;
a first insulating member arranged in the external conductor;
a second insulating member including a front surface plate in which a wire insertion hole is formed and a plurality of elastic pieces which extends from the front surface plate toward a rear surface and of which an end overlaps with a side of a front surface of the first insulating member and is movable in a direction from a front surface toward a rear surface; and
a center electrode arranged in a hollow portion in the first and second insulating members and including a terminal led out from a rear surface of the first insulating member to outside and clamping pieces for clamping the wire connected to the terminal.

Furthermore, the present technology is a high frequency unit including:
a case body in which a signal processing unit is housed; and
at least one coaxial connector fixed to the case body and of which the terminal of the center electrode is connected to the signal processing unit, in which
the coaxial connector has the configuration described above.

Moreover, the present technology is a receiver including:
a case body in which a tuner module substrate having a tuner function is housed; and
at least one coaxial connector fixed to the case body and of which the terminal of the center electrode is connected to the tuner module substrate, in which
the coaxial connector has the configuration described above.

Effects of the Invention

According to at least one embodiment, the present technology can prevent occurrence of a gap between an external conductor and an insulating member and prevent occurrence of abnormal noise even when a resin forming the insulating member is shrunk and caulking varies after being assembled by caulking. Note that the effects described here are not necessarily limited and that the effect may be any effects described in the present technology.

MODE FOR CARRYING OUT THE INVENTION

An embodiment described below is a preferable specific example of the present technology, and various technically preferable limitations are applied. However, in the following description, the scope of the present technology is not limited to the embodiment, unless there is a statement to particularly limit the present technology.

Note that the description on the present technology will be made in the following order.

<<1. Example of F-type connector>>
<<2. Embodiment>>
<<3. Application example>>
<<4. Modification>>
<<Example of F-type connector>>

Figure 1A:
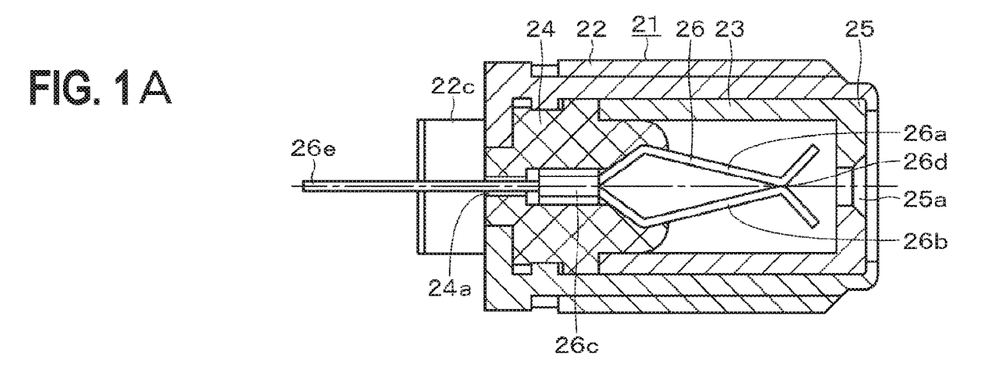
FIGS. 1A and 1B are cross-sectional views and FIG. 1C is a partially enlarged cross-sectional view of an exemplary F-type connector.
Figure 1B:
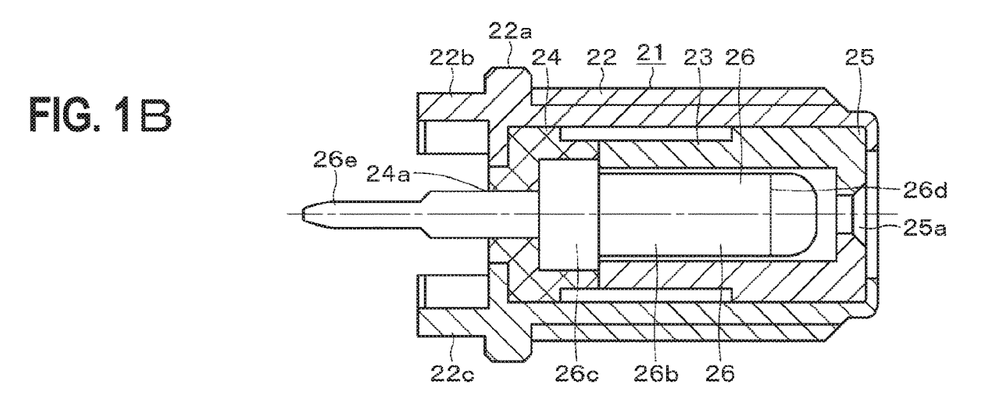

An example of an F-type connector will be described with reference to FIGS. 1A-1C. FIG. 1A is a cross-sectional view in a case where an F-type connector 21 is cut along a vertical direction, and FIG. 1B is a cross-sectional view in a case where the F-type connector 21 is cut along a horizontal direction. The F-type connector 21 includes a cylindrical external conductor 22, a cylindrical insulator 23 housed in the external conductor 22, and a center electrode 26 supported by a hollow portion of the insulator 23.

The external conductor 22 includes metals such as iron, brass, and zinc, and a thread groove is formed on a peripheral surface. A flange 22a is formed at a base portion of the external conductor 22, and caulking portions 22b and 22c are symmetrically provided on the base-portion-side end surface. For example, the caulking portions 22b and 22c are inserted into holes in a case plate of a tuner unit and are bent so that the F-type connector 21 is attached to the tuner unit.

The insulator 23 includes two portions and includes a support body 24 arranged on the base portion side and a cylindrical body 25 arranged on the front end side. A rectangular support hole 24a is formed in a base-portion-side end surface of the support body 24, and a terminal 26e of the center electrode 26 passes through the support hole 24a and is led out to the outside. A front end of the terminal 26e is bent and soldered to a predetermined portion on a printed wiring board (not shown) in a tuner case.

The center electrode 26 is arranged in an internal space formed by the support body 24 and the cylindrical body 25. The center electrode 26 includes metal having conductivity and spring property and includes clamping pieces 26a and 26b for clamping a core wire of a coaxial cable to be inserted. The clamping pieces 26a and 26b are coupled to each other with a coupling piece 26c, and a contact portion 26d having elastically contact with the clamping pieces 26a and 26c is formed. The terminal 26e is connected to the coupling piece 26c.

An inclined surface for supporting the clamping pieces 26a and 26b is formed on the support body 24. As illustrated in FIG. 1B, a width of the internal space formed by the cylindrical body 25 and the support body 24 in the horizontal direction is slightly larger than widths of the clamping pieces 26a and 26b. Ends of the clamping pieces 26a and 26b are bent to be separated from each other, and as illustrated in FIG. 1A viewed from the lateral direction, a ←-shaped front end is formed. A hole 25a is formed at the center of a front-end-side end surface of the cylindrical body 25, the core wire of the coaxial cable to be inserted through the hole 25a is inserted from the front ends of the clamping pieces 26a and 26b and clamped by the contact portion 26d.

The end surface on the front end side of the external conductor 22 is slightly projected from the end surface of the cylindrical body 25, a caulking which applies a load to a front surface and a rear surface of the external conductor 22 fixes the insulator 23 (support body 24 and cylindrical body 25).

Figure 1C:
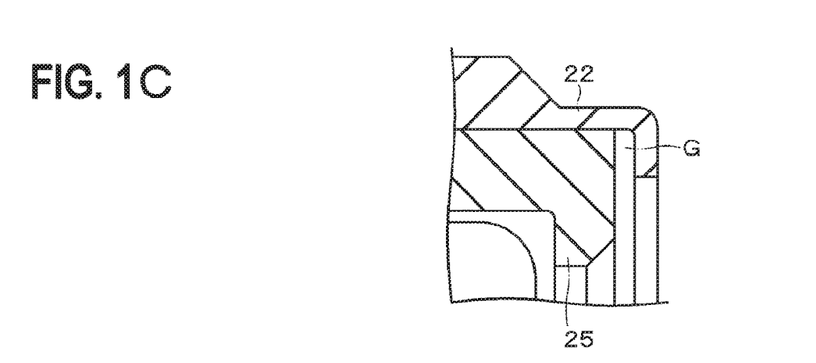

In the example of the F-type connector 21 described above, there a case where a slight gap G is generated between an end of the external conductor 22 and the cylindrical body 25 as illustrated in FIG. 1C due to loosening of the caulking, variation in dimensions of the caulking, shrinkage of the insulator 23 caused by heat generated at the time of reflow soldering, and the like. In a case where a tuner unit including the F-type connector 21 is attached to the television receiver, when large sound is generated, the insulator 23 (support body 24 and cylindrical body 25) is resonated due to the gap, and there has been a possibility that unpleasant noise occurs.

<<2. Embodiment>>

Figure 2:
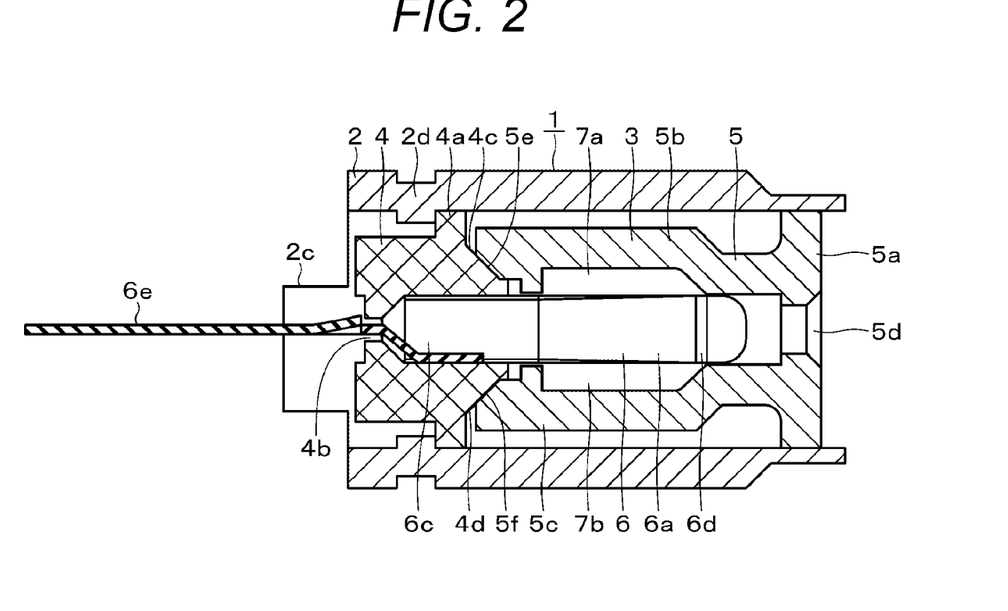
FIG. 2 is a cross-sectional view of the F-type connector according to an embodiment of the present technology at a stage before being assembled by caulking.
Figure 3:
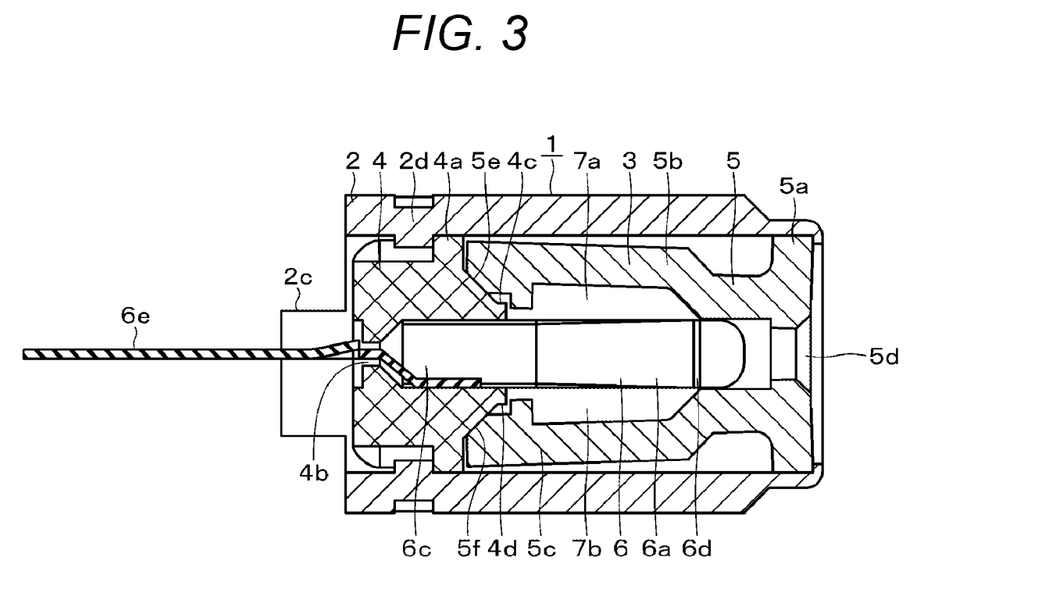
FIG. 3 is a cross-sectional view of the F-type connector according to an embodiment of the present technology at a stage after being assembled by caulking.
Figure 4:
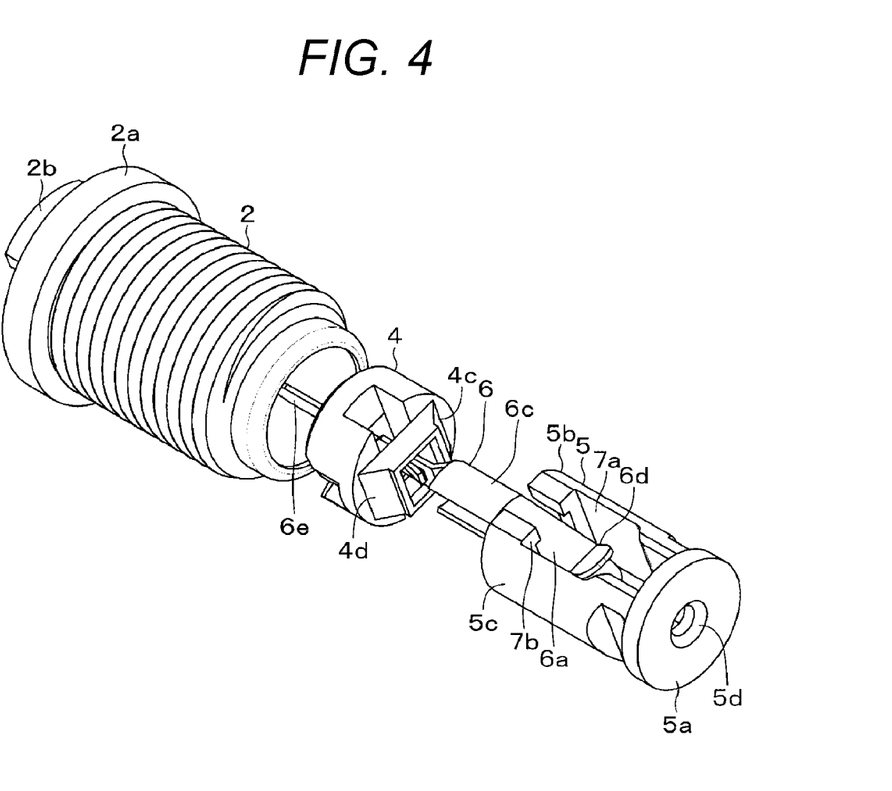
FIG. 4 is an exploded perspective view of a part of an embodiment of the present technology.
Figure 5:
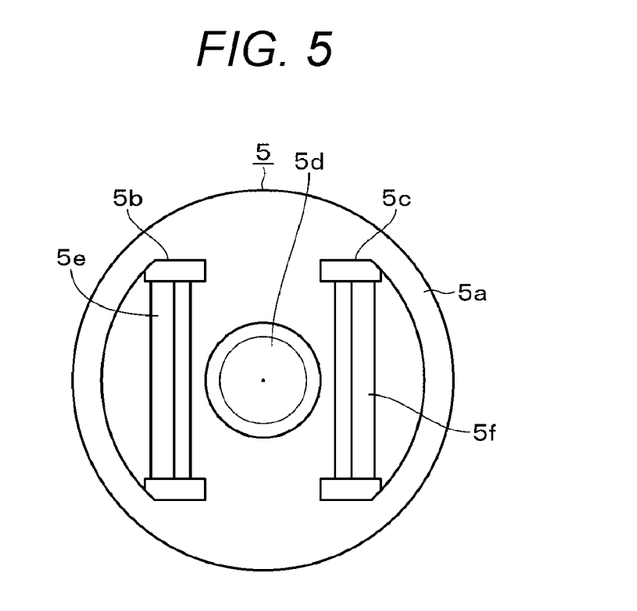
FIG. 5 is a side view for explaining an insulating member according to an embodiment of the present technology.

The present technology can prevent occurrence of the abnormal noise. Hereinafter, an embodiment of the present technology will be described. FIGS. 2 and 3 are cross-sectional views in a case where an F-type connector 1 according to the present technology is cut along the horizontal direction. FIG. 2 is a cross-sectional view of a stage before the F-type connector 1 is assembled by the caulking. FIG. 3 is a cross-sectional view of a stage after the F-type connector 1 has been assembled by the caulking. Moreover, FIG. 4 is an exploded perspective view of a part of the F-type connector 1, and FIG. 5 is a front view of a flexible member included in the insulator. Note that, in the following description, a side to be attached to a case body of a high-frequency module of the tuner unit and the like is referred to as a rear surface, and a side to which the core wire of the coaxial cable is inserted is referred to as a front surface.

The F-type connector 1 includes a cylindrical external conductor 2, an insulator 3 housed in the external conductor 2, and a center electrode 6 supported by a hollow portion of the insulator 3. The insulator 3 includes two portions and includes a first insulating member (referred to as support body below) 4 arranged on the side of the rear surface (side where F-type connector 1 is attached to tuner unit) and a second insulating member (referred to as flexible member below) 5 arranged on the side of the front surface (side to which core wire (not shown) of coaxial cable is inserted). An end of the flexible member 5 has flexibility. An assembly of the support body 4, the flexible member 5, and the center electrode 6 is inserted into an opening on the front surface of the external conductor 2 and housed in the external conductor 2.

The support body 4 and the flexible member 5 are resin molded articles. The support body 4 and the flexible member 5 are manufactured by molding resin with excellent heat resistance such as polyphenylene sulfide (PPS), liquid crystal polymer (LCP), and nylon.

The external conductor 2 includes metals such as iron, brass, and zinc, and has a cylindrical shape in which a thread groove is formed on a peripheral surface. A flange 2a is formed at a base portion of the external conductor 2, and caulking portions 2b and 2c are symmetrically provided on the base-portion-side end surface. For example, the caulking portions 2b and 2c are inserted into holes in a case plate of a tuner unit and are bent so that the F-type connector 1 is attached to the tuner unit. The F-type connector 1 may be attached by soldering, screwing with a nut, and the like. On an inner surface of the external conductor 2, a locking member (for example, projection) 2d which is brought into contact with a projection 4a formed on the support body 4 is provided. Note that, in the configuration illustrated in FIG. 4, a projection is formed on the inner surface of the external conductor 2, a guide groove is formed on an external peripheral surface of the support body 4, and the projection is inserted into the guide groove so as to lock the support body 4.

The center electrode 6 is arranged in an internal space formed by the support body 4 and the flexible member 5. The center electrode 6 includes metal having conductivity and spring property, such as phosphor bronze and includes clamping pieces 6a and 6b for clamping a core wire of a coaxial cable to be inserted. The clamping pieces 6a and 6b are coupled to each other with a coupling unit 6c, and a contact portion 6d having elastically contact with the clamping pieces 6a and 6c is formed. A terminal 6e is connected to the coupling unit 6c.

A hole for supporting the coupling unit 6c of the center electrode 6 is formed in the support body 4. Moreover, a hole 4b for leading out the terminal 6e to the rear surface is formed in the support body 4. Ends of the clamping pieces 6a and 6b are bent to be separated from each other, and a ←-shaped front end is formed.

The flexible member 5 is formed by integrally molding a circular front surface plate 5a and a pair of elastic pieces 5b and 5c planted so as to extend from the front surface plate 5a toward the rear surface. An end of the flexible member 5 is arranged to overlap with a front-surface-side end of the support body 4. The flexible member 5 is a member which is movable in a direction from the front surface toward the rear surface. The elastic pieces 5b and 5c are provided on both sides of the clamping pieces 6a and 6b so as to face each other. Recesses 7a and 7b are formed in a part of surfaces of the elastic pieces 5b and 5c facing each other. A distance between the clamping pieces 6a and 6b and the flexible member 5 is increased by the recesses 7a and 7b, and high-frequency characteristics of the F-type connector can be enhanced.

Furthermore, an insertion hole 5d for the core wire of the coaxial cable is formed substantially at the center of the front surface plate 5a. The core wire of the coaxial cable to be inserted through the hole 5d is inserted from the front ends of the clamping pieces 6a and 6b and clamped by the contact portion 6d. Portions of the elastic pieces 5b and 5c close to the front surface plate 5a are brought closer to both sides of the front ends of the clamping pieces 6a and 6b. With this configuration, the positions of the front ends of the clamping pieces 6a and 6b are restricted at the time of the insertion of the core wire, and the core wire is smoothly inserted.

On the side of the front surface of the support body 4, inclined surfaces 4c and 4d to spread the ends of the elastic pieces 5b and 5c outward are formed. Inclined surfaces 5e and 5f respectively matching the inclined surfaces 4c and 4d are formed at the respective ends of the elastic pieces 5b and 5c. The inclined surfaces 4c, 4d, 5e, and 5f are spread outward from the front surface toward the rear surface. Therefore, while holding a state of being fitted with the support body 4, the flexible member 5 is movable in the direction from the front surface toward the rear surface. Note that, the ends of the elastic pieces 5b and 5c may be spread outward by providing not only the inclined surfaces but also protrusions.

As illustrated in FIG. 2, an assembly of the support body 4, the flexible member 5, and the center electrode 6 is inserted from an opening on the side of the front surface of the external conductor 2. An end surface on the front surface side of the external conductor 2 is slightly projected from the front surface of the front surface plate 5a of the flexible member 5. Caulking is performed by applying a force between the front surface and the rear surface of the external conductor 2, and the front surface of the external conductor 2 is bent as illustrated in FIG. 3. In this way, the support body 4 and the flexible member 5 including the center electrode 6 are fixed to an inner side of the external conductor 2.

Figure 6:
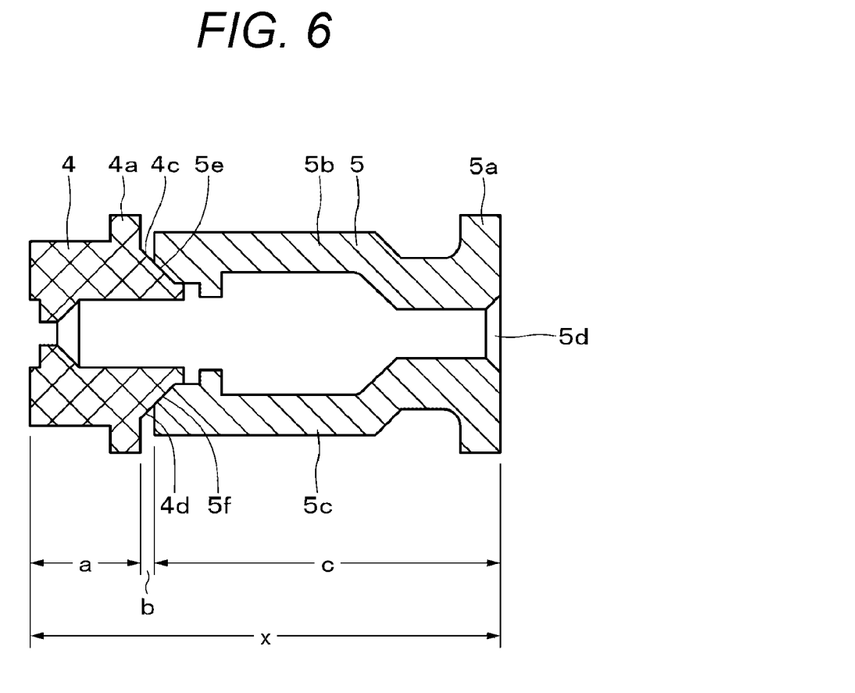
FIG. 6 is a front view for explaining the insulating member according to an embodiment of the present technology.

As illustrated in FIG. 6, before being assembled by caulking, that is, in a state where a load is not applied between the front surface and the rear surface, a gap having a width of b exists between the front ends of the elastic pieces 5b and 5c and the projection 4a of the support body 4. When it is assumed that a length from the rear surface of the support body 4 to the front surface of the projection 4a be a and a length from the front surface of the flexible member 5 to the front end be c, a length x from the rear surface of the support body 4 to the front surface of the flexible member 5 in a state of having contact with each other at a stage before the assembly is (x=a+b+c).

This length x is set to the following relationship.

$x>$(the length of a space for housing the support body 4 and the flexible member 5 in the external conductor 2+expected shrinkage amounts of resins included in the support body 4 and the flexible member 5+variation in caulking)

The load at the time of caulking is, as illustrated in FIG. 3, a force for pressing the front surface of the flexible member 5 toward the rear surface by the bent end surface of the external conductor 2. Therefore, the front ends of the elastic pieces 5b and 5c are moved toward the rear surface along the inclined surfaces 4c and 4d and are spread outward. The maximum value of the movement amount is a length b of a gap between the front ends of the elastic pieces 5b and 5c and the projection 4a of the support body 4 which has existed before assembly. In this way, when the load by caulking is applied, the flexible member 5 moves toward the rear surface side, and the gap disappears or is reduced.

Even in a case where the caulking varies or resin is shrunk, the flexible member 5 moves in a direction to fill a gap G (refer to FIG. 1C) between the inner surface at the bent end of the external conductor 2 and the front surface of the front surface plate 5a while holding an engaging state between the support body 4 and the flexible member 5. Therefore, it is possible to prevent occurrence of the gap G and prevent abnormal noise and vibration caused by the gap G.

"Specific example of center electrode"

An example of the center electrode 6 will be described with reference to FIGS. 7A-7C. The center electrode 6 is formed by processing, for example, bending a single metal plate, and two clamping pieces 6a and 6b are overlapped with each other. Moreover, the coupling unit 6c supported by the hole of the support body 4, the terminal 6e extending from one end side of the coupling unit 6c, and the contact portion 6d having contact with the clamping pieces 6a and 6b are included.

For example, in television broadcasting, 8K broadcasting is planned. An IF frequency in that case becomes higher than the current value (for example, 3.2 GHz in advanced BS). In a case where a frequency is increased in this way, it is desired to thin the width of the center electrode 6 of the F-type connector and increase a gap between the center electrode 6 and the insulating member. However, when the width of the center electrode 6 is thinned, a force to hold the core wire of the coaxial cable to which the contact portion 6d is inserted is weakened. Therefore, as illustrated in FIG. 7B, the clamping pieces 6a and 6b have arc-like cross-sectional areas.

Figure 7A:
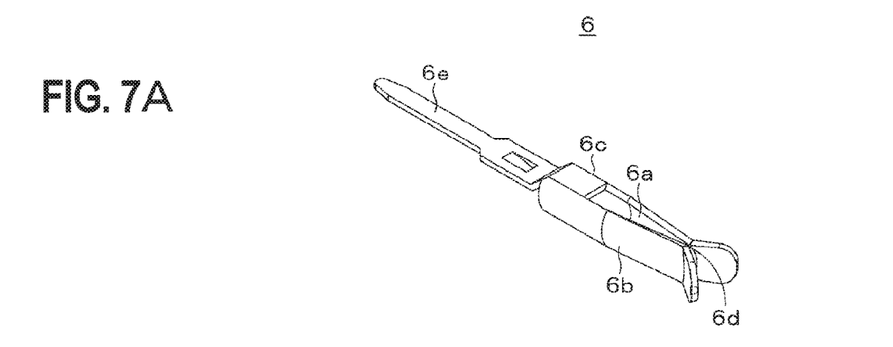
FIGS. 7A-7C are perspective views and plan views of an example of a center electrode and a plan view of the center electrode in a state where a core wire is inserted.
Figure 7B:
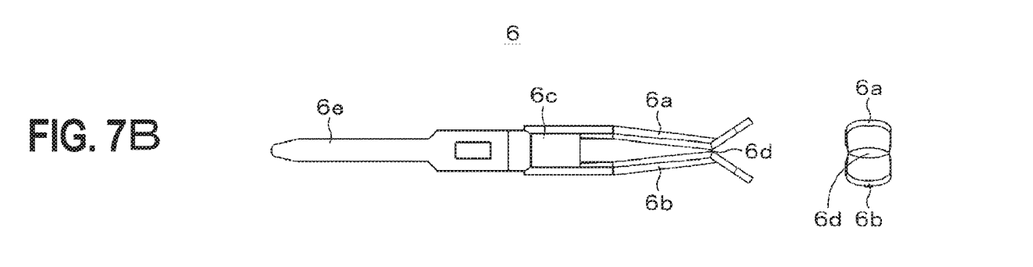
Figure 7C:
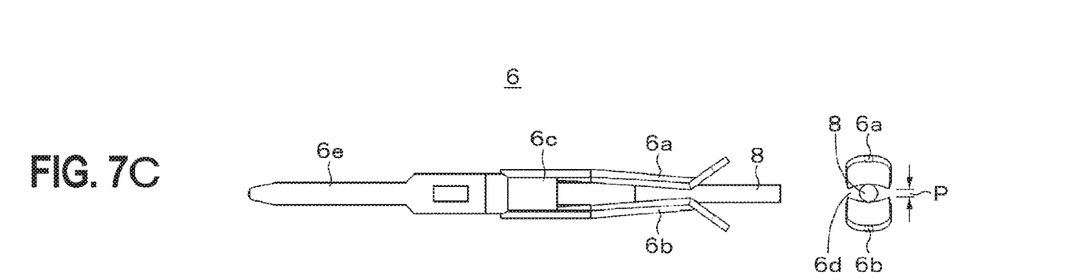

FIG. 7A is a perspective view of the center electrode 6, FIG. 7B is a front view of the center electrode 6, and FIG. 7C illustrates a state where the contact portion 6d of the clamping pieces 6a and 6b clamps a core wire 8 of a coaxial cable. In a state where the core wire 8 is clamped, an amount of the spread of the clamping pieces 6a and 6b (deflection amount of spring) is P. The amount of the spread of the clamping pieces 6a and 6b (deflection amount of spring) P is reduced due to a contact between the peripheral surface of the core wire 8 and an arc-like surface, and a holding force cannot be sufficiently improved.

Figure 8A:
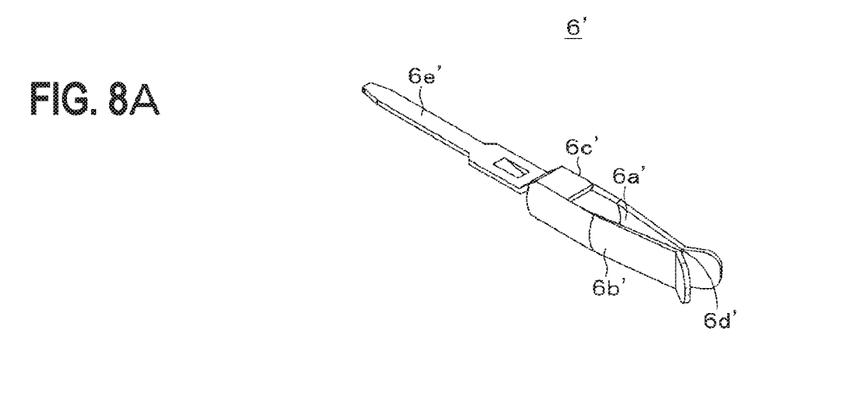
FIGS. 8A-8C are perspective views and plan views of another example of the center electrode and a plan view of the center electrode in a state where the core wire is inserted.
Figure 8B:
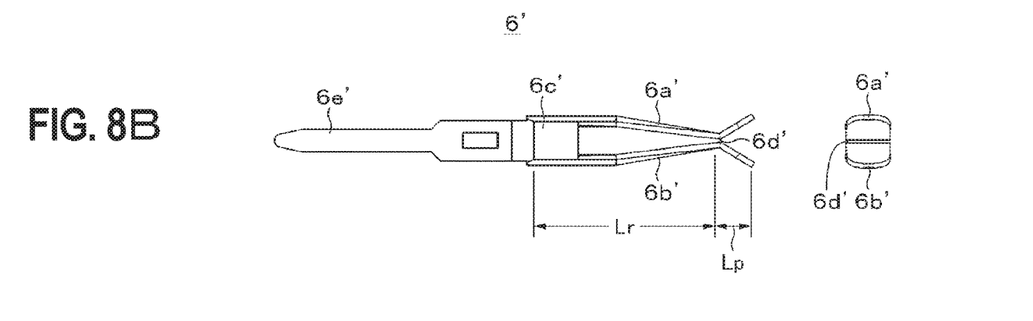
Figure 8C:
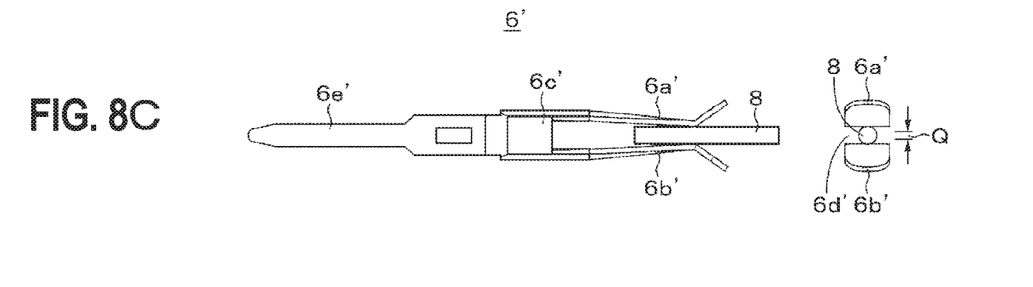

A center electrode 6' of which these points have been improved is illustrated in FIGS. 8A, 8B, and 8C. As the center electrode 6 illustrated FIGS. 7A-7C, clamping pieces 6a' and 6b', a coupling unit 6c', a terminal 6e', and a contact portion 6d' are included. A difference from the center electrode 6 is that a cross-section of a section Lp of a front end including the contact portion 6d' between the clamping pieces 6a' and 6b' has a plate-like shape. A cross-section of the clamping pieces 6a' and 6b' other than the section Lp has an arc-like shape.

Since the center electrode 6' having the above configuration clamps the core wire 8 with flat plates as illustrated in FIG. 8C, the amount of the spread of the clamping pieces 6a' and 6b' (deflection amount of spring) is an amount Q larger than an amount P in a case where the cross-section has an arc-like shape. Therefore, since the amount of the spread (deflection amount of spring) when the core wire 8 is held is increased, the holding force can be further increased.

"Electrical Characteristics of F-Type Connector"

Figure 9:
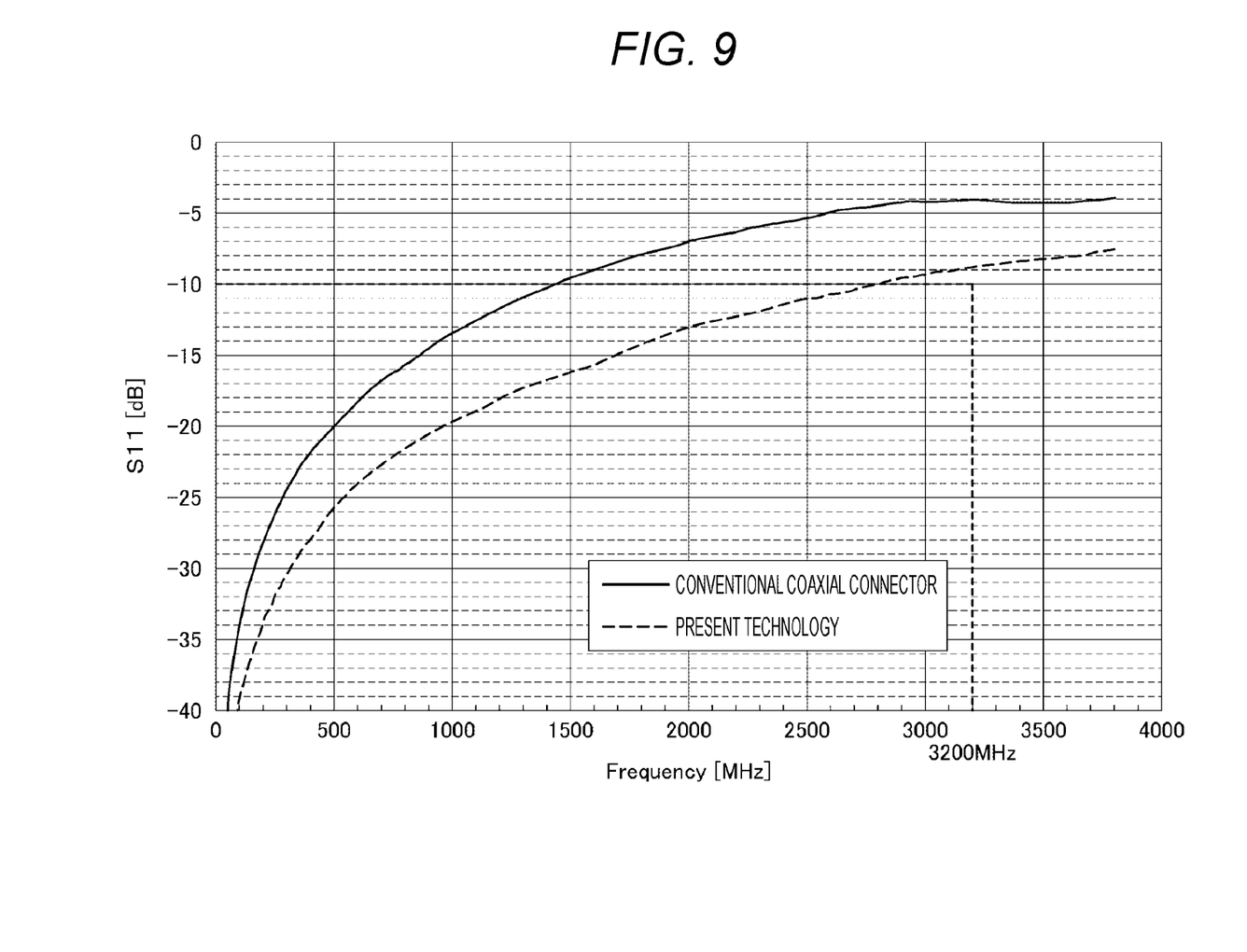
FIG. 9 is a graph of electric characteristic data of each of the F-type connector according to the present technology and the conventional F-type connector.
Figure 10:
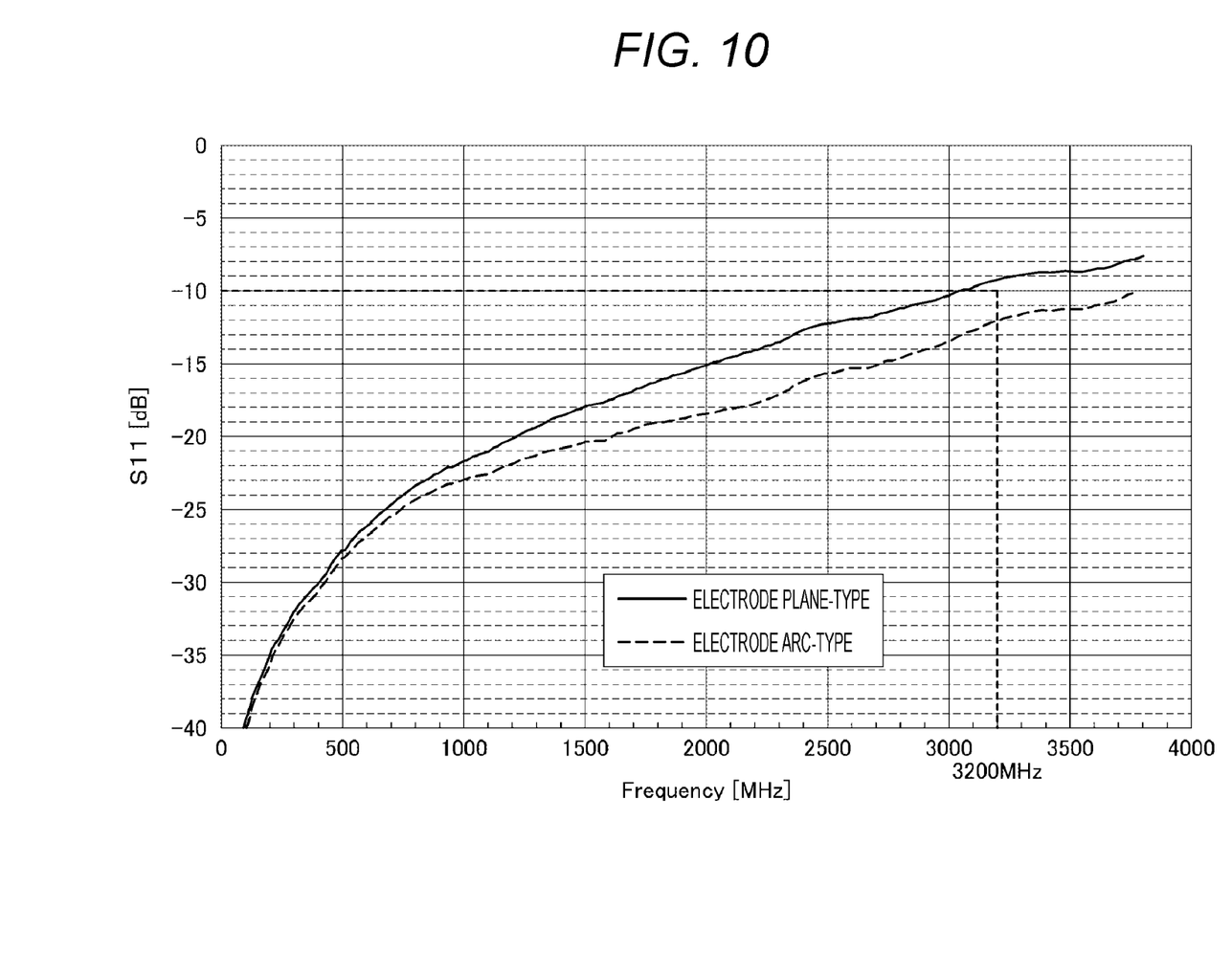
FIG. 10 is a graph of electrical characteristic data of each of two F-type connectors of which shapes of the center electrodes are different from each other.

FIGS. 9 and 10 are examples of electrical characteristics of the F-type connector. In FIGS. 9 and 10, the horizontal axis indicates a frequency, and the vertical axis indicates an S parameter S11. The S parameter S11 indicates reflection characteristics, and as the value of the parameter S11 is smaller, the reflection characteristics is better.

As illustrated FIGS. 1A-1C, the electrical characteristics indicated by a solid line in FIG. 9 is characteristics of the F-type connector 21 which includes the insulator 23 including the support body 24 and the cylindrical body 25. The electrical characteristics indicated by a broken line is characteristics of an embodiment (configuration which includes insulator 3 including support body 4 and flexible member 5) according to the present technology. As comparison between both characteristics indicates, the embodiment according to the present technology has the better reflection characteristics than the F-type connector 21 illustrated in FIGS. 1A-1C.

FIG. 10 illustrates electrical characteristics of an F-type connector including a center electrode having a different configuration. In FIG. 10, characteristics indicated by a solid line is reflection characteristics of an F-type connector of which a cross-section of the center electrode has a plate-like shape. Characteristics indicated by a broken line is reflection characteristics of an F-type connector of which a cross-section of the center electrode has an arc-like shape. The F-type connector having an arc-like cross-section has better characteristics. This is because a distance between the center electrode and the external conductor is uniformly maintained since rigidity of the center electrode is increased, the core wire can be introduced to clamping units, and the external conductor has a cylindrical shape. Since the entire center electrode 6' described above has an arc-like cross-section, the center electrode 6' has the reflection characteristics indicated by the broken line in FIG. 10, and in addition, the holding force of the core wire can be improved.

<<3. Application Example>>

"Tuner Unit"

Figure 11:
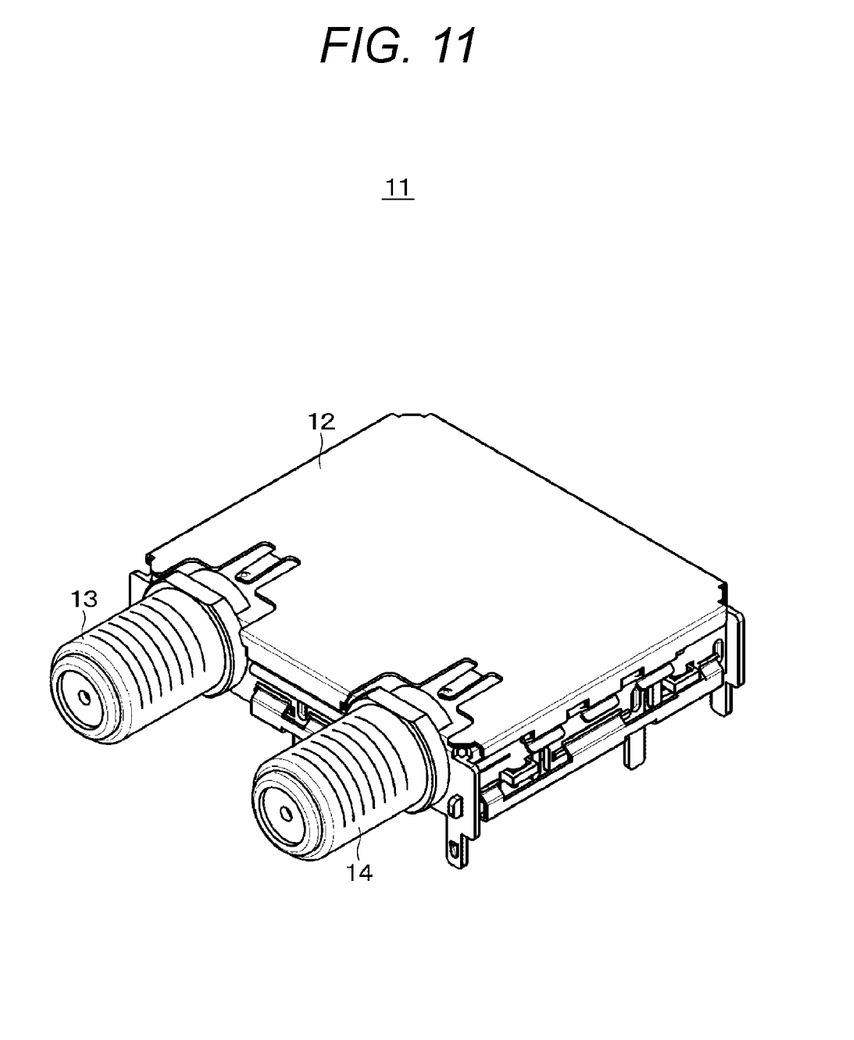
FIG. 11 is a perspective view of an appearance of a tuner unit to which a coaxial connector according to the present technology is attached.

FIG. 11 is a perspective view of an appearance of a tuner unit to which the F-type connector according to the present technology is attached. In a tuner unit 11, a tuner module substrate in which a tuner function unit is formed is provided in a tuner case 12. The tuner case 12 has a function as a shield case. Furthermore, the tuner unit 11 is fixed to the tuner case 12 and includes two antenna connectors (F-type connector) 13 and 14 to connect the core wire to the tuner module substrate provided in the tuner case 12. The F-type connector according to the present technology is used as the antenna connectors 13 and 14.

On a main surface of the tuner module substrate, for example, an IC (circuit) as a terrestrial television broadcasting (TV) tuner module function unit, an IC (circuit) as a satellite broadcast (BS) tuner module function unit, an electronic components are formed (mounted). The tuner module substrate is, for example, mounted on a circuit substrate of a television receiver.

A receiver is formed by using the tuner unit 11. For example, the receiver can receive a terrestrial television broadcast signal and a satellite broadcast signal. The receiver includes a reception antenna for receiving a broadcast signal, a tuner unit (for example, tuner unit 11 illustrated in FIG. 11) including a frequency conversion function, and a demodulator.

A first system of the receiver includes a reception antenna, an antenna connector, a filter, a Low Noise Amplifier (LNA), a tuner unit, and a demodulator. Furthermore, a second system of the receiver includes a reception antenna, an antenna connector, a filter, a low noise amplifier (LNA), a tuner unit, and a demodulator. The F-type connector according to the present technology is used as the antenna connector.

<<4. Modification>>

One embodiment of the present technology has been specifically described above. However, the present technology is not limited to the above-mentioned embodiment, and various kinds of variations based on technical ideas of the present technology are possible. For example, the present technology can be applied to other kind of high frequency unit, in addition to the tuner unit. Furthermore, the F-type connector according to the present technology may be used for a receiver such as a television broadcasting recording device, in addition to the television receiver. Furthermore, the configuration, method, process, shape, material, value, and the like described in the embodiment are merely exemplary, and different configurations, methods, processes, shapes, materials, values, and the like may be used as necessary.

Note that, the present technology can have the following configuration.

(1)

A coaxial connector including:

a cylindrical external conductor including a metal material;

a first insulating member arranged in the external conductor;

a second insulating member including a front surface plate in which a wire insertion hole is formed and a plurality of elastic pieces which extends from the front surface plate toward a rear surface and of which an end overlaps with a side of a front surface of the first insulating member and is movable in a direction from a front surface toward a rear surface; and a center electrode arranged in a hollow portion in the first and second insulating members and including a terminal led out from a rear surface of the first insulating member to outside and clamping pieces for clamping the wire connected to the terminal.

(2)

The coaxial connector according to (1), in which a length x from a rear surface of the first insulating member in a contact state to a front surface of the second insulating member at a stage before a load for caulking is applied is set to the following relationship.

> x>(length of space for housing first and second insulating members in external conductor+expected shrinkage amount of insulating member+variation in caulking)

(3)

The coaxial connector according to (1) or (2), which the first insulating member has a hole for supporting the clamping piece and leading out the terminal.

(4)

The coaxial connector according to any one of (1) (3), in which on a side of the front surface of the first insulating member, an inclined surface or a protrusion to spread ends of the elastic pieces outward is formed.

(5)

The coaxial connector according to (1) to (4), in which the pair of elastic pieces having an arc-like cross-section faces to each other and is planted on the front surface plate.

(6)

The coaxial connector according to (1) to (5), in which a part of a facing surface of the pair of elastic pieces is thin, and a recess is formed on an outer side of the center electrode.

(7)

The coaxial connector according to (1) to (6), in which portions of the facing surfaces of the pair of elastic pieces close to the front surface plate are brought closer to the clamping pieces of the center electrode.

(8)

The coaxial connector according to (1) to (7), in which the clamping piece of the center electrode includes a contact portion for clamping the wire, and a cross-section of the clamping piece including the contact portion has a plate-like shape, and a cross-section of other portion of the clamping piece has an arc-like shape.

(9)

A high frequency unit including:

a case body in which a signal processing unit is housed; and at least one coaxial connector fixed to the case body and of which a terminal of a center electrode is connected to the signal processing unit, in which the coaxial connector has the configuration according to (1).

(10)

The high frequency unit according to (9), in which the signal processing unit is a tuner module substrate having a tuner function, and the terminal of the coaxial connector is connected to the tuner module substrate.

(11)

A receiver including:

a case body in which a tuner module substrate having a tuner function is housed; and at least one coaxial connector fixed to the case body and of which a terminal of a center electrode is connected to the tuner module substrate, in which the coaxial connector has the configuration according to (1).

REFERENCE SIGNS LIST

1 F-type connector
2 external conductor
3 insulator
4 support body
4c, 4d inclined surface
5 flexible member
5a front surface plate
5b, 5c elastic piece
5e, 5f inclined surface
6 center electrode
7a, 7b recess
8 core wire

What is claimed is:

1. A coaxial connector comprising:
a cylindrical external conductor including a metal material;
a first insulating member arranged in the external conductor;
a second insulating member including a front surface plate in which a wire insertion hole is formed and a plurality of elastic pieces which extends from the front surface plate toward a rear surface and of which an end overlaps with a side of a front surface of the first insulating member and is movable in a direction from a front surface toward a rear surface; and
a center electrode arranged in a hollow portion in the first and second insulating members and including a terminal led out from a rear surface of the first insulating member to outside and clamping pieces for clamping the wire connected to the terminal.

2. The coaxial connector according to claim 1, wherein on a side of the front surface of the first insulating member, an inclined surface or a protrusion to spread ends of the elastic pieces outward is formed.

3. The coaxial connector according to claim 1, wherein the clamping piece of the center electrode includes a contact portion for clamping the wire, and
a cross-section of the clamping piece including the contact portion has a plate-like shape, and a cross-section of other portion of the clamping piece has an arc-like shape.

4. The coaxial connector according to claim 1, wherein the first insulating member has a hole for supporting the clamping piece and leading out the terminal.

5. The coaxial connector according to claim 4, wherein the pair of elastic pieces having an arc-like cross-section faces to each other and is planted on the front surface plate.

6. The coaxial connector according to claim 5, wherein a part of a facing surface of the pair of elastic pieces is thin, and a recess is formed on an outer side of the center electrode.

7. The coaxial connector according to claim 5, wherein portions of the facing surfaces of the pair of elastic pieces close to the front surface plate are brought closer to the clamping pieces of the center electrode.

* * * * *